United States Patent
Marini et al.

(10) Patent No.: US 12,442,310 B2
(45) Date of Patent: Oct. 14, 2025

(54) TURBINE ENGINE SCROLL FOR USE WITH AN INTERNAL COMBUSTION ENGINE

(71) Applicant: Pratt & Whitney Canada Corp., Longueuil (CA)

(72) Inventors: Remo Marini, Lasalle (CA); Christopher J. Gover, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/129,616

(22) Filed: Mar. 31, 2023

(65) Prior Publication Data
US 2024/0328323 A1   Oct. 3, 2024

(51) Int. Cl.
*F01D 9/04*   (2006.01)

(52) U.S. Cl.
CPC .............. *F01D 9/048* (2013.01); *F01D 9/041* (2013.01); *F05D 2240/12* (2013.01)

(58) Field of Classification Search
CPC .......... F01D 9/026; F01D 9/041; F01D 9/042; F01D 9/047; F01D 9/048; F01D 25/24; F01D 25/246; F05D 2240/12
See application file for complete search history.

(56) References Cited

U.S. PATENT DOCUMENTS

| | | | |
|---|---|---|---|
| 6,302,647 B1 | 10/2001 | Schueler | |
| 6,834,501 B1 | 12/2004 | Vrbas | |
| 7,931,437 B1 | 4/2011 | Johnson | |
| 9,581,045 B2 | 2/2017 | Nagae | |
| 9,957,822 B2 | 5/2018 | Uhlenhake | |
| 2010/0196145 A1* | 8/2010 | Lombard | F02C 6/12 415/148 |
| 2011/0268559 A1* | 11/2011 | Lombard | F01D 17/167 415/159 |
| 2015/0093236 A1* | 4/2015 | Faeth | F04D 17/10 415/148 |
| 2015/0159660 A1* | 6/2015 | Kares | F01D 17/165 417/406 |
| 2015/0285301 A1* | 10/2015 | Begin | F16C 33/1065 415/170.1 |
| 2020/0291800 A1* | 9/2020 | Eckl | F01D 9/047 |
| 2020/0291808 A1* | 9/2020 | Eckl | F02B 37/025 |
| 2023/0027258 A1* | 1/2023 | Taniguchi | F01D 9/041 |

FOREIGN PATENT DOCUMENTS

| | | |
|---|---|---|
| GB | 2544809 B | 10/2019 |
| IN | 107725195 A | 2/2018 |
| WO | 2022118033 A1 | 6/2022 |

\* cited by examiner

*Primary Examiner* — Mark A Laurenzi
*Assistant Examiner* — Xiaoting Hu
(74) *Attorney, Agent, or Firm* — Getz Balich LLC

(57) ABSTRACT

A turbine scroll for use with an axial turbine is provided. The turbine scroll includes a flow channel, a scroll inlet, a plurality of stator vanes, and a plurality of vane passages. The flow channel is defined by an outer radial wall extending between first and second axial sidewalls that are spaced widthwise apart from one another. The stator vanes are disposed within the flow channel, spaced apart from one another, and are disposed around a circumference of the scroll. Each vane passage is defined between adjacent stator vanes. Each vane passage is open to an outer flow channel portion disposed radially between the stator vanes and the outer radial wall and is open to an annular region disposed radially inside of the stator vanes. The vane passages are configured to direct gas flow in an inwardly spiraling direction.

20 Claims, 6 Drawing Sheets

TURBINE ENGINE SCROLL FOR USE WITH AN INTERNAL COMBUSTION ENGINE

BACKGROUND OF THE INVENTION

1. Technical Field

The present disclosure relates rotary engines in general and to turbine scrolls for use with internal combustion engines in particular.

2. Background Information

A rotary internal combustion engine ("rotary engine") sometimes referred to as a Wankel engine typically include a plurality of similar axially aligned rotary units driving a common eccentric shaft. Each rotary unit includes an exhaust port for collecting combustion gases produced in the respective rotary unit. In some instances, the rotary engine may be paired with a scroll that organizes engine combustion gases for entry into a turbine. The turbine may be connected to compressor that draws in air and provides it to the rotary engine for use in combustion.

Each rotary unit of the rotary engine operates in a cyclic manner, periodically producing combustion gases. The collective flow of combustion gases from the rotary engine, therefore, includes a periodic portion that may be referred to as "pulsation portion". The combustion gases exiting a conventional scroll (i.e., entering the turbine inlet) typically have circumferential and radial flow nonuniformities as a function of time. In other words, the aforesaid non-uniformities may be spatially disposed (e.g., circumferentially, radially) and variable as a function of time. This non-uniform gas flow entering the turbine very often decreases the turbine (isentropic) efficiency and subjects the turbine to periodic excitation forces that over time can cause structural effects; e.g., fatigue.

SUMMARY

According to an aspect of the present disclosure, a turbine scroll for use with an axial turbine is provided. The turbine scroll includes a flow channel, a scroll inlet, a plurality of stator vanes, and a plurality of vane passages. The flow channel is defined by an outer radial wall extending between a first axial sidewall and a second axial sidewall. The first and second axial side walls are spaced widthwise apart from one another. The flow channel extends circumferentially around a center axis. The scroll inlet is configured to permit gas flow into the flow channel. The stator vanes are disposed within the flow channel, spaced apart from one another, and are disposed around a circumference of the scroll. Each vane passage is defined between adjacent stator vanes. Each vane passage is open to an outer flow channel portion of the flow channel disposed radially between the stator vanes and the outer radial wall and is open to an annular region disposed radially inside of the stator vanes. The vane passages are configured to direct gas flow in an inwardly spiraling direction having a radially inward component and a circumferential component.

In any of the aspects or embodiments described above and herein, the stator vanes may be uniformly configured.

In any of the aspects or embodiments described above and herein, the stator vanes may be uniformly spaced around the circumference of the scroll.

In any of the aspects or embodiments described above and herein, the vane passages may be uniformly configured.

In any of the aspects or embodiments described above and herein, the outer radial wall of the of the flow passage may be non-axisymmetric about the center axis.

In any of the aspects or embodiments described above and herein, the outer radial wall may spiral radially inwardly around the circumference of the spool, and the outer flow channel portion may have a cross-sectional area that decreases circumferentially.

In any of the aspects or embodiments described above and herein, each vane passage has a height and an arcuately extending length, and the height may be uniform along the arcuately extending length.

In any of the aspects or embodiments described above and herein, the vane passages may include a first vane passage having a first geometric configuration, and a second vane passage having a second geometric configuration, and the first geometric configuration may be different from the second geometric configuration.

In any of the aspects or embodiments described above and herein, each stator vane may extend widthwise between the first axial sidewall and the second axial sidewall.

In any of the aspects or embodiments described above and herein, each stator vane may extend widthwise parallel to the center axis.

In any of the aspects or embodiments described above and herein, at least one of the stator vanes may extend widthwise non-parallel to the center axis.

In any of the aspects or embodiments described above and herein, each stator vane may be connected to the first and second axial sidewalls.

In any of the aspects or embodiments described above and herein, each stator vane may have has a suction side surface extending between a leading edge and a trailing edge, and a pressure side surface having a pressure side (PS) intervane passage portion and a trailing edge (TE) arc annular portion, wherein the PS intervane passage portion extends between the leading edge and the TE arc annular portion, and the TE arc annular portion extends between the trailing edge and the PS intervane passage portion.

In any of the aspects or embodiments described above and herein, the TE arc annular portions of the stator vanes may define an outer radial perimeter of the annular region disposed radially inside of the plurality of stator vanes.

In any of the aspects or embodiments described above and herein, each pair of adjacent stator vanes may include a forward stator vane and an aft stator vane, and each vane passage may be defined by a portion of the suction side surface of the forward stator vane and the PS intervane passage portion of the pressure side surface of the aft stator vane.

According to an aspect of the present disclosure, a rotary engine is provided that includes a plurality of rotary units, an exhaust manifold, and a turbine scroll. The rotary units are in communication with one another, and each rotary unit has an exhaust port. The exhaust manifold is connected to the exhaust port of each rotary unit. The exhaust manifold is configured to periodically receive combustion gases from each exhaust port during operation of the engine. The turbine scroll is in fluid communication with the exhaust manifold and is configured to receive the periodic flow of combustion gases. The turbine scroll includes a flow channel, a scroll inlet, a plurality of stator vanes, and a plurality of vane passages. The flow channel is defined by an outer radial wall extending between a first axial sidewall and a second axial sidewall. The first and second axial side walls are spaced widthwise apart from one another. The flow channel extends circumferentially around a center axis. The scroll inlet is configured to permit gas flow into the flow channel. The stator vanes are disposed within the flow channel, spaced apart from one another, and are disposed around a circumference of the scroll. Each vane passage is defined between adjacent stator vanes. Each vane passage is open to an outer flow channel portion of the flow channel disposed radially between the stator vanes and the outer radial wall and is open to an annular region disposed radially inside of the stator vanes. The vane passages are configured to direct gas flow in an inwardly spiraling direction having a radially inward component and a circumferential component.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
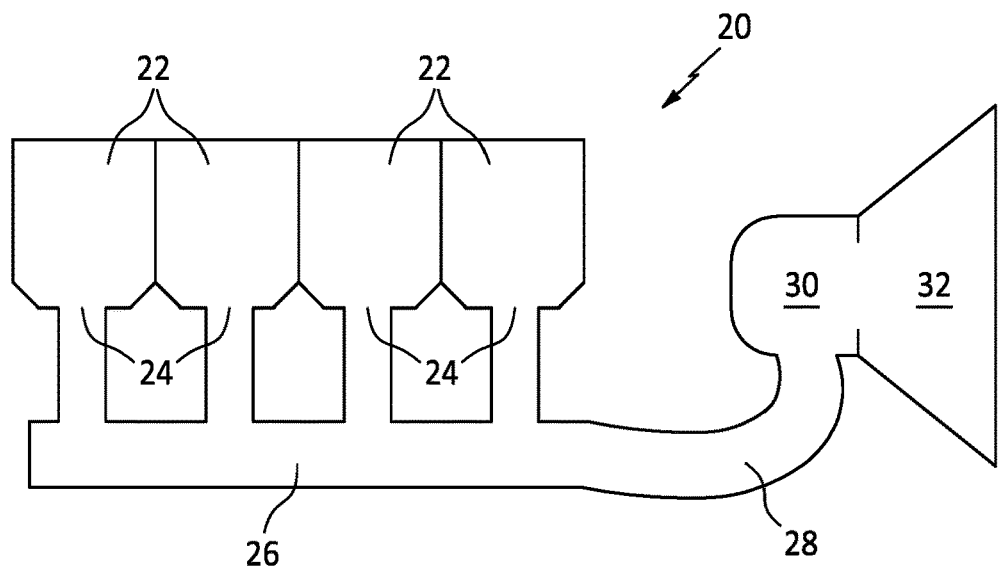
FIG. 1 is a diagrammatic illustration of a rotary engine.

Referring to FIG. 1, an example of an internal combustion engine is diagrammatically shown in the form of a rotary engine 20. The present disclosure is not limited to use with rotary engines. The rotary engine 20 includes a plurality of similar axially aligned rotary units 22 driving a common eccentric shaft. The rotary engine 20 shown diagrammatically in FIG. 1 includes four rotary units 22 but it is understood that the engine 20 could comprise any number of rotary units 22. The present disclosure is not limited to use with any particular rotary engine 20 configuration. Each of the rotary units 22 includes an exhaust port 24 for collecting combustion gases produced in the respective rotary unit 22. The engine 20 includes an exhaust manifold 26 configured to be paired with the exhaust ports 24. An exhaust pipe 28 connects the exhaust manifold 26 to a scroll 30 (sometimes referred to as a "volute") that organizes the combustion gases for entry into a turbine 32. The turbine 32 may be connected to compressor (not shown) that draws in air and provides it to the rotary engine 20 for use in combustion.

Figure 2:
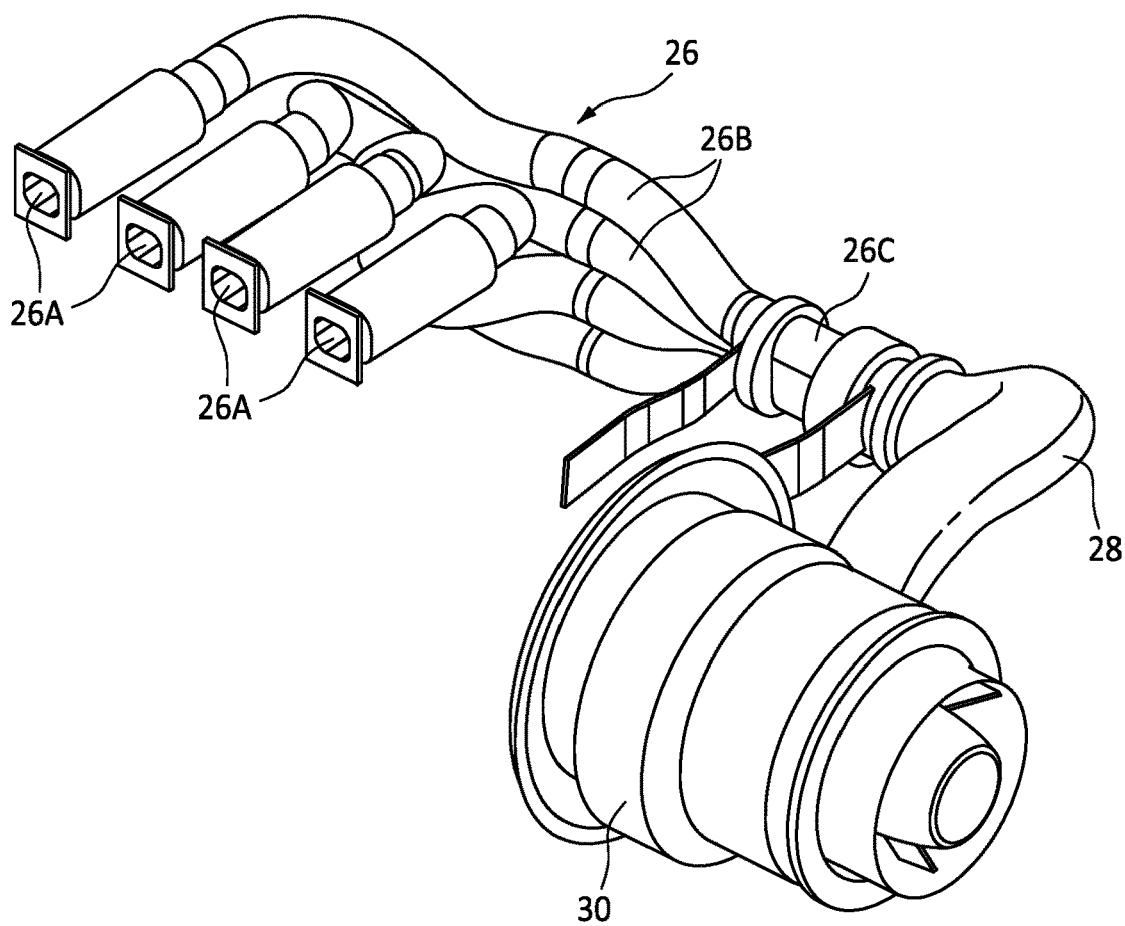
FIG. 2 is a diagrammatic perspective view of an exhaust manifold coupled to a present disclosure spool embodiment and turbine.

FIG. 2 illustrates an embodiment of an exhaust manifold 26 (sometimes referred to as an "exhaust header") that includes an initial segment 26A for each rotary unit 22 and a respective manifold pipe 26B extending from each initial segment 26A to a collector 26C. As can be seen in FIG. 2, each of the manifold pipes 26B (four shown in the exemplary exhaust manifold 26) are combined into the collector 26C. In the exhaust manifold 26 example shown in FIG. 2, the manifold pipes 26B are combined into the collector 26C in a stacked arrangement and the collector 26C is oblong or oval shaped. In alternative embodiments, the collector 26C may be circular. The present disclosure is not limited to this particular collector 26C configuration. The manifold pipes 26B are typically configured (e.g., length, diameter, routing, and the like) so that the combustion gases exiting each rotary unit 22 are subjected to a similar pressure and flow profile. In this manner, the operating parameters of each rotary unit 22 are made as uniform as possible, thereby facilitating collective operation of the rotary units 22 of the rotary engine 20. An exhaust pipe 28 extends between the exhaust manifold collector 26C and the inlet of the scroll 30. In those embodiments wherein the collector 26C is oblong/oval shaped, the exhaust pipe 28 between the collector 26C and the inlet of the scroll 30 may also be oblong/oval shaped.

The scroll 30 embodiment shown in FIG. 2 may be described as a single port annular scroll; i.e., the combustion gases from the exhaust manifold 26 are directed into a single port of the annular scroll 30. The scroll 30 is configured to organize the combustion gases to produce a flow of combustion gases exiting the scroll 30 and entering the turbine 32 at a high tangential velocity; i.e., a high exit swirl.

Each rotary unit 22 of the rotary engine 20 operates in a cyclic manner, periodically producing combustion gases. The collective flow of combustion gases from the rotary engine 20, therefore, includes a periodic portion that may be referred to as "pulsation portion". The combustion gases exiting a conventional scroll (i.e., entering the turbine inlet) typically have circumferential and radial flow nonuniformities as a function of time. In other words, the aforesaid non-uniformities may be spatially disposed (e.g., circumferentially, radially) and variable as a function of time. This non-uniform gas flow entering the turbine very often decreases the turbine (isentropic) efficiency and subjects the turbine to periodic excitation forces that over time can cause structural effects; e.g., fatigue. Historically, some axial turbines have addressed this issue by adding one or more turbine initial stages (sometimes referred to as a "sacrificial stages") configured to mitigate or "settle" the gas flow non-uniformities. Disadvantages to this approach include the greater size, additional weight, and additional cost associated with sacrificial turbine stages.

Figure 3:
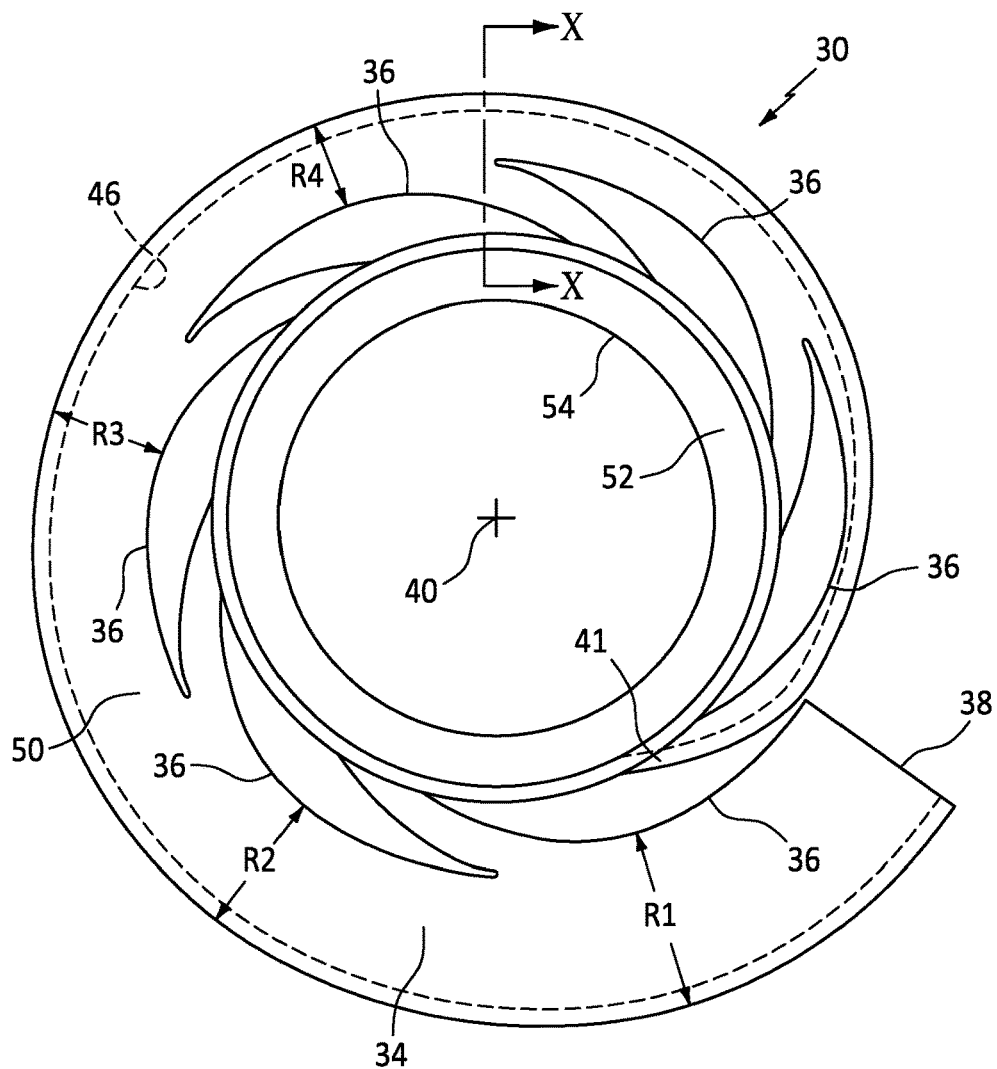
FIG. 3 is a diagrammatic representation of a present disclosure spool embodiment.
Figure 4:
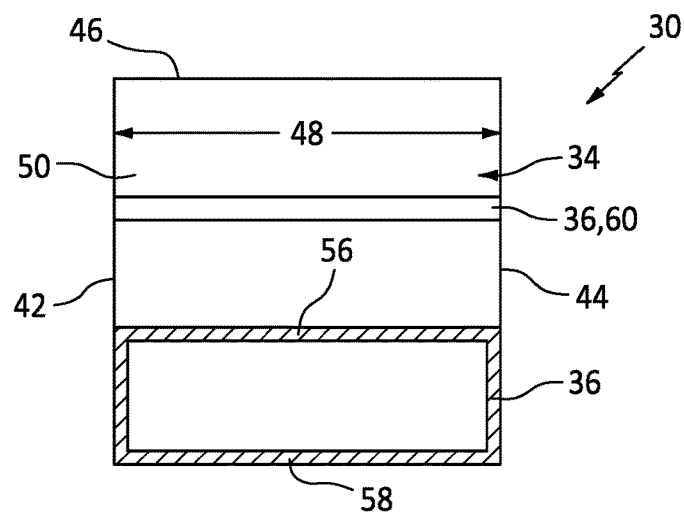
FIGS. 4-7 are diagrammatic representations of a flow channel cross-section.
Figure 5:
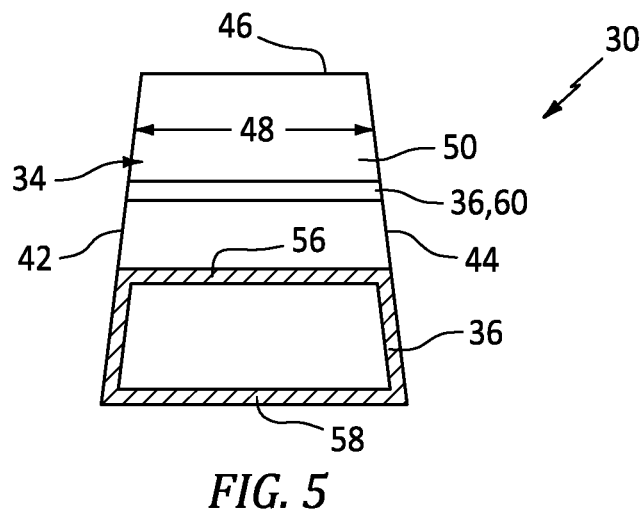
Figure 6:
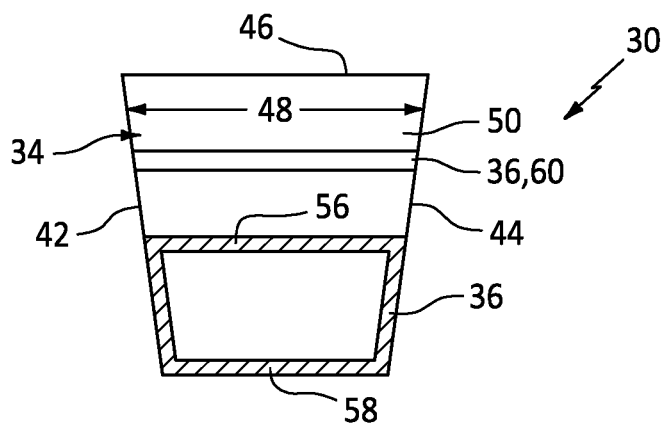
Figure 7:
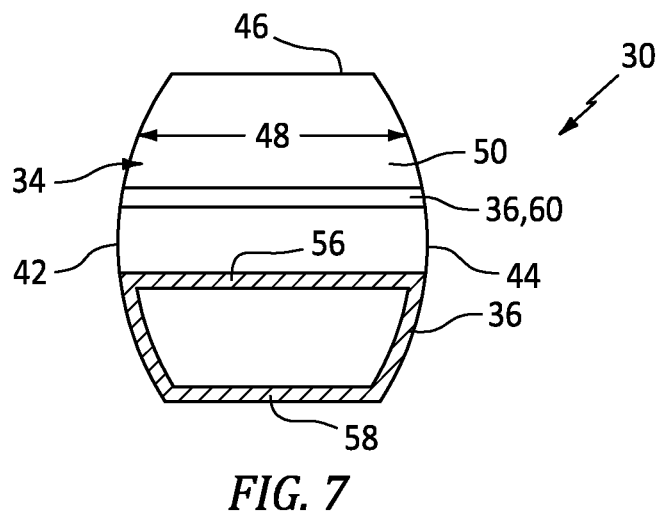

Referring to FIG. 3, the present disclosure scroll 30 is configured to attenuate the pulsatile portion of the combustion gas flow and thereby increase turbine efficiency and decrease periodic excitation forces potentially detrimental to the turbine. The present disclosure scroll may be used, for example, with an axial reaction turbine, an axial impulse turbine, or the like.

The present disclosure scroll 30 includes a generally annularly extending flow channel 34, a plurality of stator vanes 36, and a scroll inlet 38. The stator vanes 36 are disposed in the flow channel 34, spaced apart from one another and disposed around the circumference of the scroll 30. The scroll 30 includes a center axis 40. The flow channel 34 extends from the scroll inlet 38 to a terminal end 41 disposed at a vane passage 68 as will be described herein. The scroll inlet 38 may be aligned with a stator vane 36.

The flow channel 34 may be defined by a first axial sidewall 42, a second axial sidewall 44, and an outer radial wall 46. The first and second axial sidewalls 42, 44 are axially (i.e., "widthwise") spaced apart from one another. The outer radial wall 46 extends between the first and second axial sidewalls 42, 44 and defines the outer radial extent of the flow channel 34. FIG. 3 diagrammatically illustrates a side view of a present disclosure scroll 30 embodiment, shown open (e.g., an axial sidewall removed) to permit the stator vanes 36 to be seen. In the planar view of FIG. 3, the center axis 40 extends perpendicularly, into and out of the page. FIGS. 4-7 diagrammatically show scroll 30 cross-sections taken at section X-X to illustrate different flow channel 34 configurations.

In some embodiments, the first and second axial sidewalls 42, 44 and the outer radial wall 46 may form a flow channel 34 having a rectangular-like cross-section wherein the first and second axial sidewalls 42, 44 are substantially parallel one another and the outer radial wall 46 is substantially perpendicular to the first and second axial sidewalls 42, 44; e.g., see FIG. 3. In these embodiments, the width 48 of the flow channel 34 may be substantially constant. In some embodiments, the first and second axial sidewalls 42, 44 may converge or diverge from one another to produce a varying flow channel 34 width between the outer radial limit of the flow channel 34 (i.e., at the outer radial wall 46) and the inner radial limit of the flow channel 34; e.g., see FIGS. 5 and 6. In other embodiments, one or both of the first and second axial sidewalls 42, 44 may not be planar and the first and second axial sidewalls 42, 44 may not therefore be parallel one another. For example, one or both of the first and second axial sidewalls 42, 44 may be arcuately shaped; e.g., the arcuately shaped first and/or second axial sidewall 42, 44 may curve away from the other of the first and/or second axial sidewall 42, 44 to produce a flow channel 34 width that varies between the outer radial limit of the flow channel 34 (i.e., at the outer radial wall 46) and the inner radial limit of the flow channel 34; e.g., see FIG. 7. The flow channel 34 configurations shown in FIGS. 3-7 are non-limiting examples.

The intersection between the outer radial wall 46 and one or both the first and second axial sidewalls 42, 44 may have different configurations. For example, the outer radial wall 46 may intersect directly with an axial sidewall 42, 44 (e.g., a perpendicular intersection), or the intersection between the outer radial wall 46 and an axial sidewall 42, 44 may be radiused, or a fillet surface (e.g., planar or arcuate) may extend between the outer radial wall 46 and the axial sidewall 42, 44 proximate the intersection. The present disclosure is not limited to any particular outer radial wall 46 and axial sidewall 42, 44 intersection configuration.

In some embodiments (e.g., see FIG. 3), the outer radial wall 46 may be a planar surface. In some embodiments, the outer radial wall 46 may be arcuately shaped. The present disclosure is not limited to any particular outer radial wall 46 configuration.

The outer radial wall 46 is disposed radially outside of the stator vanes 36 and is spaced apart from the outer radial surface of each stator vane 36 (e.g., the suction side surface 56 of the respective stator vane 36) by a distance R; e.g., R1 for a first stator vane 36, R2 for a second stator vane 36, R3 for a third stator vane 36, and the like. The portion of the flow channel 34 disposed between the suction side surface 56 of a respective stator vane 36 and the outer radial wall 46 may be referred to as the "outer flow channel portion 50".

In some embodiments (e.g., see FIG. 3), the outer radial wall 46 spirals inwardly starting at the scroll inlet 38 as the outer radial wall 46 extends circumferentially around the scroll 30. In this embodiment, the outer radial wall 46 may be described as non-axisymmetric (about the center axis 40). The inward spiral of the outer radial wall 46 can be seen by the change in radial distances R between the stator vanes 36 and the outer radial wall 46 as the flow channel 34 extends circumferentially from the scroll inlet 38; e.g., R1>R2>R3, and so on. In these outer radial wall 46 non-axisymmetric embodiments, the cross-sectional area of the outer flow channel portion 50 (i.e., in a plane perpendicular to the flow channel 34 and to the collective circumferential direction of flow within the channel 34) decreases in the spiral direction away from the scroll inlet 38. In some embodiments, the flow channel 34 with an outer flow channel portion 50 having a cross-sectional area that decreases in a circumferential direction (as a result of the non-axisymmetric outer radial wall 46) may be described as extending from the scroll inlet 38 to the terminal end 41 where the outer flow channel portion 50 terminates at a vane passage 68; e.g., see FIG. 3. The present disclosure flow channel is not limited to this embodiment.

In some embodiments, the outer radial wall 46 may extend circumferentially around the scroll 30 at a constant spacing from the stator vanes 36 and the radial distances between the stator vanes 36 and the outer radial wall 46 remain constant; e.g., R1=R2=R3, and so on. In these outer radial wall 46 axisymmetric embodiments (symmetric about the center axis 40), the cross-sectional area of the outer flow channel portion 50 remains constant in the spiral direction away from the scroll inlet 38.

The stator vanes 36 are configured to direct air traveling circumferentially within the flow channel 34 radially inwardly into an annular region 52 disposed radially between the stator vanes 36 and a turbine annulus outer diameter surface 54. The aforesaid annular region 52 may be referred to as an "annular collection region 52". The gas flow entering the annular collection region 52 subsequently passes axially into the turbine while maintaining its angular momentum.

Figure 8:
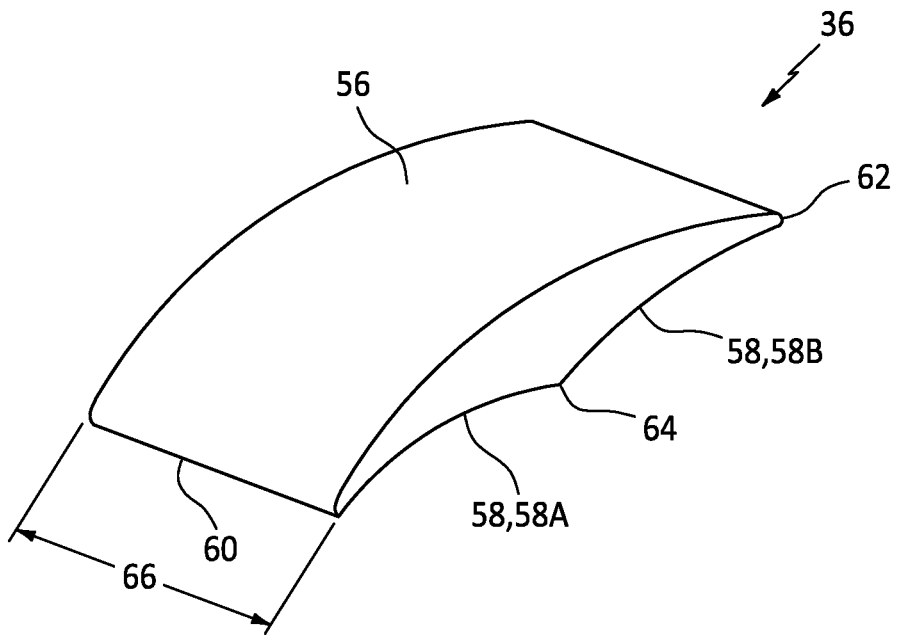
FIG. 8 is a diagrammatic isometric view of a stator vane embodiment.
Figure 9:
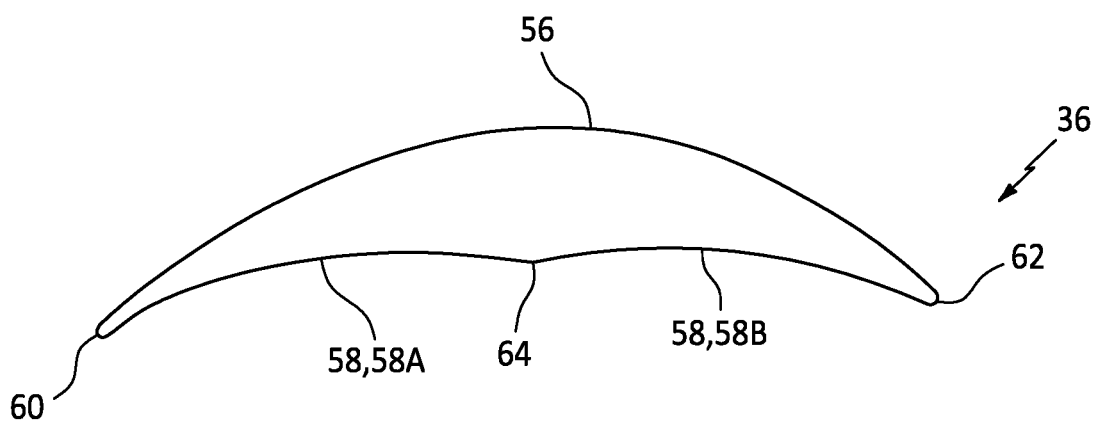
FIG. 9 is a diagrammatic isometric view of a stator vane embodiment.

Referring to FIGS. 8 and 9, in the embodiment shown in FIGS. 3, 8, and 9, each stator vane 36 has a suction side surface 56, a pressure side surface 58, a leading edge 60, and a trailing edge 62. The pressure side surface 58 includes a pressure side (PS) intervane passage portion 58A and a trailing edge (TE) annular passage portion 58B. The PS intervane passage portion 58A extends from the leading edge 60 to the TE arc annular portion 58B, and the TE arc annular portion 58B extends from the trailing edge 62 to the PS intervane passage portion 58A. The PS intervane passage portion 58A and the TE arc annular portion 58B may meet at an inflection point 64. The TE arc annular portions 58B of the stator vanes define an outer radial perimeter of the annular collection region 52. Each stator vane 36 has a width 66 that extends between the axial sidewalls 42, 44 of the flow channel 34. The leading edge 60 of a stator vane 36 may be arcuately configured (e.g., as a radiused surface that is parti-circular or parti-elliptical, or the like), and the trailing edge 62 of a stator vane 36 may be arcuately configured (e.g., as a radiused surface that is parti-circular or parti-elliptical, or the like). The present disclosure is not limited to the stator vane 36 embodiment shown in FIGS. 3, 8, and 9, and the present disclosure is not limited to embodiments wherein all of the stator vanes 36 are the configured the same.

In some embodiments, the pressure side surface 58 and the suction side surface 56 of each stator vane 36 extend widthwise between and intersect with the first and second axial sidewalls 42, 44 of the flow channel 34. The pressure side and suction side surfaces 56, 58 may intersect directly with an axial sidewall 42, 44 (e.g., a perpendicular intersection), or the intersection may be radiused, or a fillet surface (e.g., planar or arcuate) may extend therebetween, or there may be an undercut disposed between the pressure side surface 58 and an axial sidewall 42, 44 and/or between the suction side surface 56 and an axial sidewall 42, 44; e.g., where one or both respective axial sidewalls 42, 44 are shaped inwardly at the pressure side surface 58 and/or the suction side surface 56. Some sidewall configurations of this type may be described as having a "C" like shape. The present disclosure is not limited to any particular intersection configuration between the pressure sidewall 58 and a flow channel axial sidewall 42, 44, or between the suction sidewall 56 and a flow channel axial sidewall 42, 44. In some embodiments, a stator vane 36 may be configured to extend widthwise between, but not intersect with, the first axial sidewall 42 and/or the second axial sidewall 44 of the flow channel 34. In those embodiments wherein a stator vane 36 extends widthwise between but does not intersect with an axial sidewall 42, 44, the stator vane 36 may be spaced apart from the respective axial sidewall 42, 44.

As stated above, the stator vanes 36 are disposed in the flow channel 34, spaced apart from one another and disposed around the circumference of the scroll 30. The present disclosure scroll 30 diagrammatically shown in FIG. 3 is shown with six (6) stator vanes 36 spaced apart from one another and disposed around the circumference of the scroll 30. Embodiments of the present disclosure scroll 30 may have as few as two (2) stator vanes 36 and may include more than six (6) stator vanes 36. The present disclosure is not limited to any particular number of stator vanes 36.

The circumferential spacing of the stator vanes 36 produces a vane passage 68 disposed between each pair of adjacent stator vanes 36; e.g., a vane passage 68 is formed between forward and aft adjacent stator vanes 36 within the flow channel 34. A first point in the flow channel 34 that encounters the circumferential flow in the flow channel 34 before a second point is said to be "forward" or "upstream" of the second point, or conversely the second point is said to be "aft" or "downstream" of the first point. More specifically, each vane passage 68 between adjacent forward and aft stator vanes 36 is defined by a portion of the suction side surface 56 of a forward stator vane 36 and the PS intervane passage portion 58A of the adjacent aft stator vane 36. Each vane passage 68 may extend in a direction that has a radial component and a circumferential component (i.e., the vane passage 68 spirals inwardly), as shown in FIG. 3. Each vane passage 68 extends a length 70 between the outer flow channel portion 50 and the annular collection region 52. In some embodiments, the stator vanes 36 may be configured to define a vane passage 68 having length over width ratio (which may be referred to as a length over hydraulic diameter ratio, or L/Dh) greater than one (1) to impart desirable flow directionality and tangential velocity. In each vane passage 68, the distance between the portion of the suction side surface 56 of the forward stator vane 36 and the PS intervane passage portion 58A of the adjacent aft stator vane 36 may be referred to as the "height" or "H" of the vane passage 68.

Figure 10A:
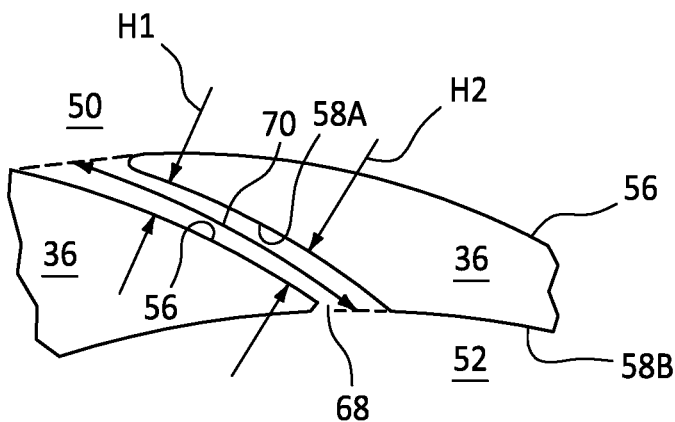
FIGS. 10A-C are diagrammatic illustrations of vane passage configurations.
Figure 10B:
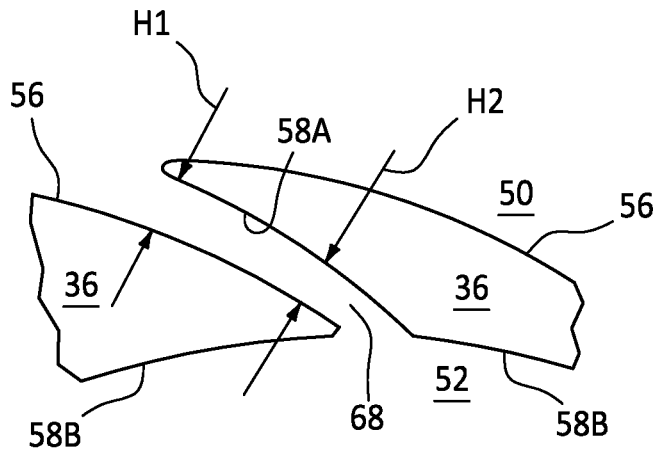
Figure 10C:
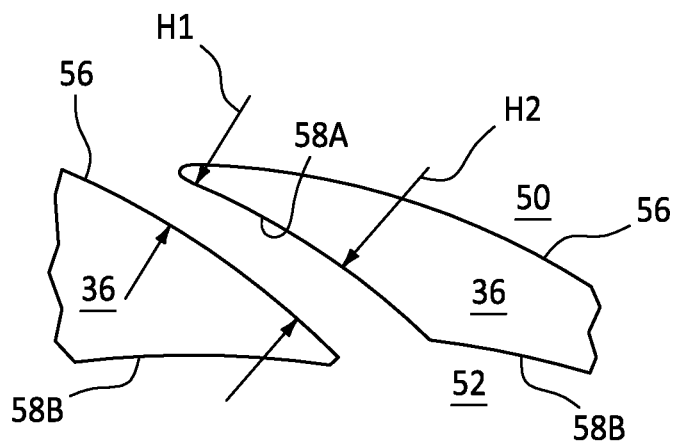

Referring to FIGS. 10A-C, in some embodiments adjacent stator vanes 36 may be configured such that the vane passage 68 therebetween has a uniform height along the vane passage length 70; see FIG. 10A, H1=H2. In some embodiments, adjacent stator vanes 36 may be configured such that the vane passage 68 therebetween converges along the vane passage length 70 between the outer flow channel portion 50 and the annular collection region 52; e.g., see FIG. 10B, H1>H2. In some embodiments, adjacent stator vanes 36 may be configured such that the vane passage 68 therebetween diverges along the vane passage length 70 between the outer flow channel portion 50 and the annular collection region 52; e.g., see FIG. 10C, H1<H2.

In some embodiments, like that diagrammatically shown in FIG. 3, the stator vanes 36 may be uniformly configured and uniformly spaced around the circumference of the spool 30, which produces uniformly configured vane passages 68; e.g., all vane passages 68 have the same geometric configuration. In a "uniform" spool/stator vane 36 configuration like this, the gas flow will enter the annular collection region 52 at equidistant circumferential points; e.g., in a spool configuration having six (6) uniform stator vanes 36, vane passages 68 are disposed at sixty degrees (60°) angular spacings. The present disclosure is not, however, limited to this uniform configuration. For example, in some embodiments the stator vanes 36 may not be uniformly configured, but rather configured to define vane passages 68 that are not circumferentially equidistant one another; e.g., assuming six (6) stator vanes 36, all vane passages 68 may not be disposed at sixty degree (60°) angular spacings. As will be described herein, the present disclosure spool 30 is configured to increase the uniformity of the gas flow into the turbine. In some applications, the gas flow entering the spool 30 may be such that gas flow entering the annular collection region 52 from circumferentially equidistant positioned vane passages 68 may improve the uniformity of the gas flow into the turbine, or conversely in some applications gas flow entering the spool 30 may be such that gas flow entering the annular collection region 52 from circumferentially non-equidistant positioned vane passages 68 may improve the uniformity of the gas flow into the turbine.

In some embodiments like that shown in FIG. 3, the stator vane 36 features (e.g., the suction side surface 56, the pressure side surface 58, the leading edge 60, the trailing edge 62) may extend widthwise parallel to the center axis 40 of the scroll 30. In some embodiments, the stator vane 36 features (e.g., the suction side surface 56, the pressure side surface 58, the leading edge 60, the trailing edge 62) may have an axial twist in a widthwise direction and are not therefore parallel to the center axis 40 of the scroll 20. Here again, the present disclosure spool 30 is configured to increase the uniformity of the gas flow into the turbine. In some applications, one or more stator vanes 36 having features with an axial twist in a widthwise direction may be included to improve the uniformity of the gas flow into the turbine.

Figure 11:
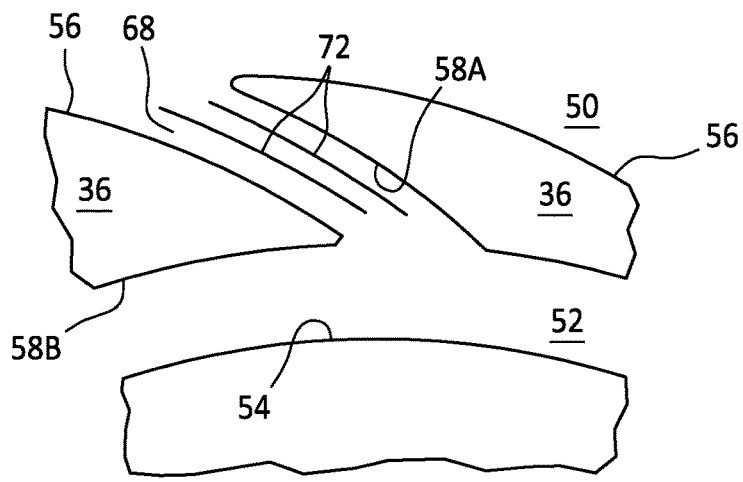
FIG. 11 is a diagrammatic illustration of a vane passage having gas flow ribs.

Referring to FIG. 11, in some embodiments, one or more gas flow guide panels 72 may be disposed within a vane passage 68 to facilitate guiding gas flow passing through a vane passage 68. In some configurations, the gas flow panels 72 may be configured to provide structural stiffening of the vane passage 68. A gas flow guide panel 72 may extend widthwise a portion or all of the distance between the axial sidewalls 42, 44. In some embodiments, a gas flow guide panel 72 may include a first portion connected to a first of the axial sidewalls 42, 44, extending toward the opposite axial sidewall, and a second portion connected to the other of the axial sidewalls 42, 44, extending toward the opposite axial sidewall. A gas flow guide panel 72 may extend a portion or all of the length of a vane passage 68.

In some embodiments, the stator vanes 36 may be mounted so as to be pivotable within the flow channel 34 and connected to an actuating device (not shown) configured to pivot the stator vanes 36; e.g., to change the angle of attack of the leading edge 60 relative to the gas flow traveling circumferentially within the flow channel 34.

Figure 12:
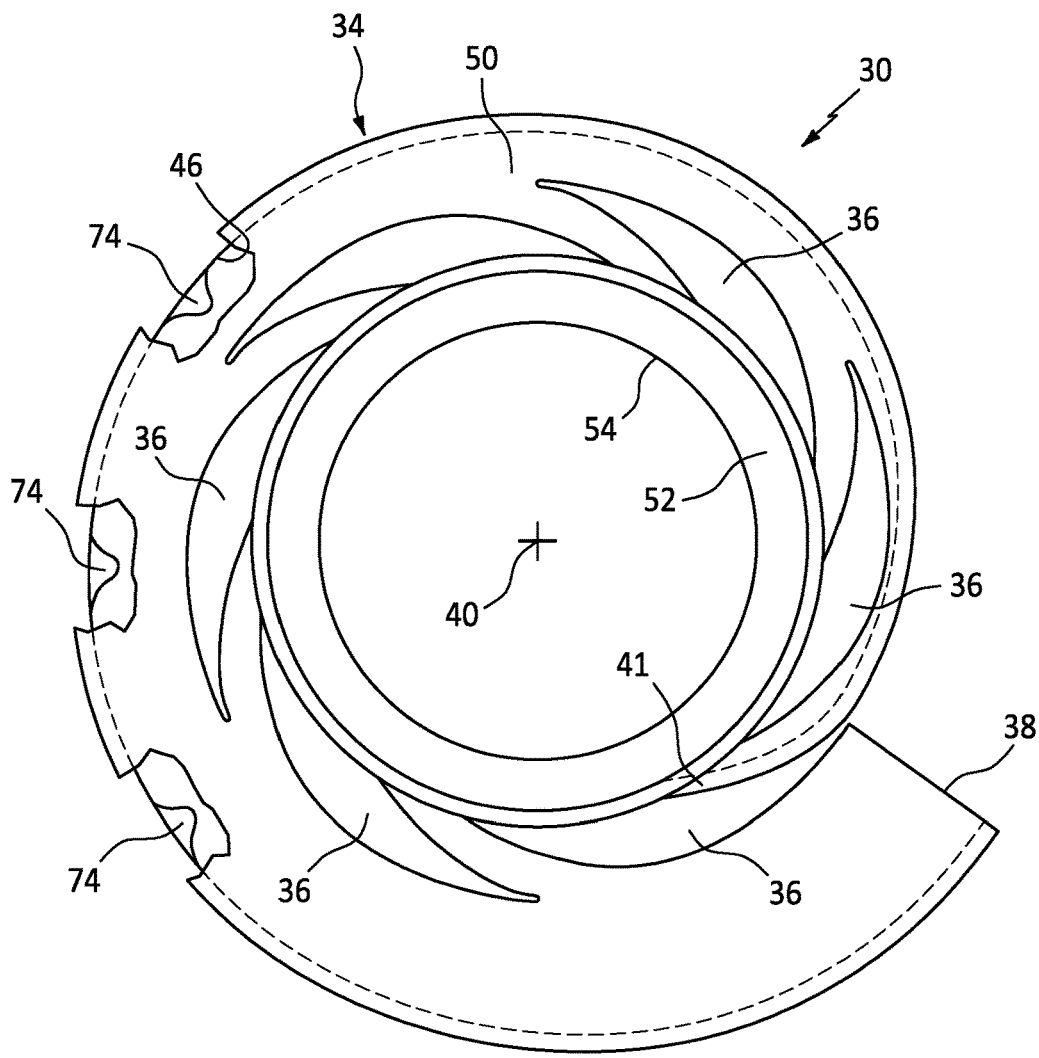
FIG. 12 is a diagrammatic representation of a present disclosure spool embodiment having flow diverters.

In some embodiments, one or more flow diverters 74 (sometimes referred to as "ski jumps") may be attached to an interior surface of the flow channel 34. A flow diverter 74 may be attached to a surface and be configured to divert flow away from the surface to which the flow diverter 74 is attached. In FIG. 12 for example, a plurality of flow diverters 74 are shown attached to the outer radial surface 46 of the flow channel 34 to divert circumferential flow within the flow channel 34 away from the outer radial wall 46 and more generally toward the radially inward stator vanes 36.

In some embodiments, the stator vanes 36 may be hollow bodies. In those embodiments, the interior cavity of a stator vane 36 (defined at least in part by the suction side surface and the pressure side surface) may include structural elements (e.g., ribs, struts, and the like). In some embodiments, an exterior surface of a stator vane 36 may include elements (e.g., ribs) that provide structural support and/or may function to guide gas flow. In some embodiments, one or more struts may extend within the flow channel 34 to support a stator vane 36.

As stated above, embodiments of the present disclosure scroll are configured to increase the uniformity of gas entering the turbine, including mitigating the pulsed portion of the combustion gas flow and thereby decrease the entry of pulsed gas flow into the turbine. The scroll embodiment described above having an outer radial wall 46 that extends non-axisymmetrically relative to the center axis 40 of the scroll (i.e., a radially inward spiral) and thereby creates an outer flow channel 34 cross-sectional area that decreases in the spiral direction away from the scroll inlet is understood to provide particular utility. The radially decreasing outer flow channel 34 facilitates guiding gas flow towards the stator vanes 36 and vane passages 68. It is understood that the radially decreasing outer flow channel 34 improves gas flow velocity uniformity (e.g., a nearly uniform Mach number as a function of time) circumferentially within the flow channel 34, which in turn attenuates gas flow pulsation, decreases circumferential and radial flow nonuniformity as a function of time, and maintains and/or generates high tangential gas flow velocity (i.e., high exit swirl) prior to the turbine. The decrease in pulsatile flow is also understood to provide noise reduction.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. For example, present disclosure rotors 32 are described herein as having axial end surfaces and peripheral surfaces 42. The term "surface" as used may include a single surface or may include a plurality of surface sections that collectively form a surface. Hence, the term "surface" is not intended to be limited to a single planar surface. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A turbine scroll for use with an axial turbine, comprising:
   a flow channel defined by an outer radial wall extending between a first axial sidewall and a second axial sidewall, the first axial sidewall and second axial sidewall spaced widthwise apart from one another, the flow channel extending circumferentially around a center axis;
   a scroll inlet configured to permit gas flow into the flow channel;
   a plurality of stator vanes disposed within the flow channel, spaced apart from one another and disposed around a circumference of the scroll, each stator vane having a suction side surface extending between a leading edge and a trailing edge, and a pressure side surface having a pressure side (PS) intervane passage portion and a trailing edge (TE) arc annular portion, the PS intervane passage portion extending arcuately inward and continuously along an entire length of the PS intervane passage portion between the leading edge and the TE arc annular portion, the TE arc annular portion extending arcuately between the trailing edge and the PS intervane passage portion, and the PS intervane passage portion and the TE arc annular portion meet at an inflection point; and
   a plurality of vane passages, each vane passage defined between adjacent said stator vanes of the plurality of stator vanes, each vane passage is open to an outer flow channel portion of the flow channel disposed radially between the stator vanes and the outer radial wall and is open to an annular region disposed radially inside of the plurality of stator vanes, the vane passages configured to direct gas flow in an inwardly spiraling direction having a radially inward component and a circumferential component.

2. The turbine scroll of claim 1, wherein the plurality of stator vanes are uniformly configured.

3. The turbine scroll of claim 2, wherein the plurality of stator vanes are uniformly spaced around the circumference of the scroll.

4. The turbine scroll of claim 3, wherein the plurality of vane passages are uniformly configured.

5. The turbine scroll of claim 4, wherein the outer radial wall of the flow channel is non-axisymmetric about the center axis.

6. The turbine scroll of claim 5, wherein the outer radial wall spirals radially inwardly around the circumference of the scroll, and the outer flow channel portion has a cross-sectional area that decreases circumferentially.

7. The turbine scroll of claim 6, wherein each vane passage of the plurality of vane passages has a height and an arcuately extending length, and the height is uniform along the arcuately extending length.

8. The turbine scroll of claim 1, wherein the plurality of vane passages includes a first vane passage having a first geometric configuration, and a second vane passage having a second geometric configuration, and the first geometric configuration is different from the second geometric configuration.

9. The turbine scroll of claim 1, wherein each stator vane of the plurality of stator vanes extends widthwise between the first axial sidewall and the second axial sidewall.

10. The turbine scroll of claim 9, wherein each stator vane of the plurality of stator vanes extends widthwise parallel to the center axis.

11. The turbine scroll of claim 9, wherein at least one of the plurality of stator vanes extends widthwise non-parallel to the center axis.

12. The turbine scroll of claim 9, wherein each stator vane of the plurality of stator vanes is connected to the first axial sidewall and the second axial sidewall.

13. The turbine scroll of claim 1, wherein the outer radial wall of the flow channel is non-axisymmetric about the center axis.

14. The turbine scroll of claim 13, wherein the outer radial wall spirals radially inwardly around the circumference of the scroll, and the outer flow channel portion has a cross-sectional area that decreases circumferentially.

15. The turbine scroll of claim 1, wherein the plurality of stator vanes includes a first stator vane having a first geometric configuration, and a second stator vane having a second geometric configuration, and the first geometric configuration is different from the second geometric configuration.

16. The turbine scroll of claim 1, wherein the TE arc annular portions of the plurality of stator vanes define an outer radial perimeter of the annular region disposed radially inside of the plurality of stator vanes.

17. The turbine scroll of claim 16, wherein each pair of adjacent said stator vanes includes a forward stator vane and an aft stator vane, and each said vane passage is defined by a portion of the suction side surface of the forward stator vane and the PS intervane passage portion of the pressure side surface of the aft stator vane.

18. The turbine scroll of claim 1, wherein the annular region is disposed radially between the plurality of stator vanes and a turbine annulus.

19. A rotary engine, comprising:
   a plurality of rotary units in communication with one another, each rotary unit having an exhaust port;
   an exhaust manifold connected to the exhaust port of each rotary unit, the exhaust manifold configured to periodically receive combustion gases from each exhaust port during operation of the engine;
   a turbine scroll in fluid communication with the exhaust manifold and configured to receive the periodic flow of combustion gases, the turbine scroll comprising:
      a flow channel defined by an outer radial wall extending between a first axial sidewall and a second axial sidewall, the first axial sidewall and second axial sidewall spaced widthwise apart from one another, the flow channel extending circumferentially around a center axis;
      a scroll inlet configured to permit gas flow into the flow channel;
      a plurality of stator vanes disposed within the flow channel, spaced apart from one another and disposed around a circumference of the scroll, each stator vane having a suction side surface extending between a leading edge and a trailing edge, and a pressure side surface having a pressure side (PS) intervane passage portion and a trailing edge (TE) arc annular portion, the PS intervane passage portion extending arcuately inward and continuously along an entire length of the PS intervane passage portion between the leading edge and the TE arc annular portion, the TE arc annular portion extending arcuately between the trailing edge and the PS intervane passage portion, and the PS intervane passage portion and the TE arc annular portion meet at an inflection point; and a plurality of vane passages, each vane passage defined between adjacent said stator vanes of the plurality of stator vanes, each vane passage is open to an outer flow channel portion of the flow channel disposed radially between the stator vanes and the outer radial wall and is open to an annular region disposed radially inside of the plurality of stator vanes, the vane passages configured to direct gas flow in an inwardly spiraling direction having a radially inward component and a circumferential component;

wherein the turbine scroll is configured to attenuate the periodic flow of combustion gases.

20. The rotary engine of claim 19, wherein the outer radial wall of the of the flow channel spirals radially inwardly around the circumference of the scroll, and the outer flow channel portion has a cross-sectional area that decreases circumferentially.

\* \* \* \* \*